(12) United States Patent
Wu

(10) Patent No.: US 7,997,664 B2
(45) Date of Patent: Aug. 16, 2011

(54) HUB FOR OFF-ROAD MOTORCYCLE

(76) Inventor: Judy Wu, Changhua County (TW)

( * ) Notice: Subject to any disclaimer, the term of this patent is extended or adjusted under 35 U.S.C. 154(b) by 136 days.

(21) Appl. No.: 12/555,813

(22) Filed: Sep. 9, 2009

(65) Prior Publication Data

US 2011/0057506 A1   Mar. 10, 2011

(51) Int. Cl.
*B60B 27/00* (2006.01)
(52) U.S. Cl. ........................... 301/110.5; 301/59
(58) Field of Classification Search .............. 301/59, 301/110.5, 110.6
See application file for complete search history.

(56) References Cited

U.S. PATENT DOCUMENTS

| | | | | |
|---|---|---|---|---|
| 766,302 A | * | 8/1904 | White | 301/60 |
| 1,490,574 A | * | 4/1924 | MacGregor | 301/59 |
| 2,246,492 A | * | 6/1941 | Aldridge | 301/110.5 |
| 2,568,834 A | * | 9/1951 | Streifthau | 301/1 |
| 5,626,401 A | * | 5/1997 | Terry et al. | 301/59 |
| 5,647,643 A | * | 7/1997 | Noble | 301/110.5 |
| 7,658,452 B2 | * | 2/2010 | Spahr et al. | 301/110.5 |

* cited by examiner

*Primary Examiner* — Russell Stormer

(57) ABSTRACT

A hub for off-road motorcycle includes a bearing having a first portion and a second portion respectively formed on two opposite ends thereof. Each of the first portion and the second portion has a connecting flange extended therefrom. A first annular element has a first through hole defined therein. The first annular element has a plurality of first spoke holes defined therein. A second annular element has a second through hole defined therein. The second annular element has a plurality of second spoke holes defined therein. When the hub adapts to be assembled with spokes, the first annular element and the second annular element are slightly pivotally rotated relative to the bearing for adapting to easily adjustably assemble the spokes with a rim.

4 Claims, 6 Drawing Sheets

HUB FOR OFF-ROAD MOTORCYCLE

BACKGROUND OF THE INVENTION

1. Field of the Invention

The present invention relates to a hub for off-road motorcycle, and more particularly to a hub having two adjustable annular elements for easily assembling.

2. Description of Related Art

A conventional hub for off-road motorcycle in accordance with the prior art comprises a bearing having two connecting portions respectively integrally formed at two ends thereof. Each of the two connecting portions having a plurality spoke holes defined radially spacedly thereon. The spokes holes of each of the connecting portions are staggeringly arranged and correspond to a plurality of holes on a rim, such that a plurality of spokes is assembled between the holes of the rim and the spoke holes of the hub.

However, when the spoke holes are drilled inaccurately, the spokes are unable to be precisely mounted between the hub and the rim, because the hub is integrally formed and is unable to be adjusted. If the spokes are mounted in an incorrect way, the rim is easily deformed without the correct support by the spokes. Therefore, the manufacture of the conventional hub is time-consuming if each of the spoke holes is drilled in an accurate position on the hub.

The present invention has arisen to mitigate and/or obviate the disadvantages of the conventional hub for off-road motorcycle.

SUMMARY OF THE INVENTION

The main objective of the present invention is to provide an improved hub for off-road motorcycle.

To achieve the objective, the hub for off-road motorcycle in accordance with the present invention includes a bearing having a first portion and a second portion respectively formed on two opposite ends thereof. Each of the first and the second portions has a connecting flange extending therefrom. Each of the two connecting flanges has a plurality of arc-shaped recesses defined radially spacedly on an outer periphery thereof. Each of the first and the second portions has a threaded portion formed outwardly thereon.

The hub comprises a first annular element having a first through hole defined on a centre thereof and a second annular element having a second through hole defined on a centre thereof. Each of the first and second through holes has a plurality of arc-shaped protrusions extending radially spacedly from an inner periphery thereof. The arc-shaped recesses are in a shape approximately corresponding to the arc-shaped protrusions. An inner diameter of each of the first and the second through holes is slightly larger than the outer diameter of the connecting flange. When the first and second portions respectively pass through the first and second through holes, the first annular element and the second annular element respectively loosely engage with the two connecting flanges of the first and the second portions.

Moreover, the first annular element has a plurality of first spoke holes defined radially spacedly thereon and extending through two lateral sides thereof. The second annular element has a plurality of second spoke holes defined radially spacedly thereon and extending through two lateral sides thereof. The first spoke holes are arranged staggeringly relative to the second spoke holes. The second annular element has a plurality of locking portions extending radially spacedly from an outer periphery thereof. Each of the locking portions has a bore defined therein, such that the second annular element is adapted to be locked on a sprocket or disc plate.

The hub further comprises two retainers respectively connected to the first portion and the second portion. Each of the two retainers has a threaded hole defined in the centre thereof for being correspondingly screwed to the threaded portion.

Accordingly, when the hub adapts to be assembled with multiple spokes, the first annular element and the second annular element are slightly pivotally rotated relative to the bearing for adapting to easily, adjustably, and accurately assemble the spokes with a rim. When the assembly of the spokes is done, a nylon patch is filled between each of the first and the second annular element and each of the two connecting flanges for accurately securing the first and second annular elements in place.

In accordance with a second aspect of the present invention, each of the first and the second annular elements having a plurality of screw holes defined in the arc-shaped protrusions. Each of the two retainers having a plurality of screw holes defined therein and corresponding to the screw holes on the first and second annular elements. A plurality of screws passing through the screws holes on each of the first and the second annular elements via the screw holes on the corresponding retainer for screwedly securing the first and the second annular elements to the bearing.

Further benefits and advantages of the present invention will become apparent after a careful reading of the detailed description with appropriate reference to the accompanying drawings.

DETAILED DESCRIPTION OF THE INVENTION

Figure 1:
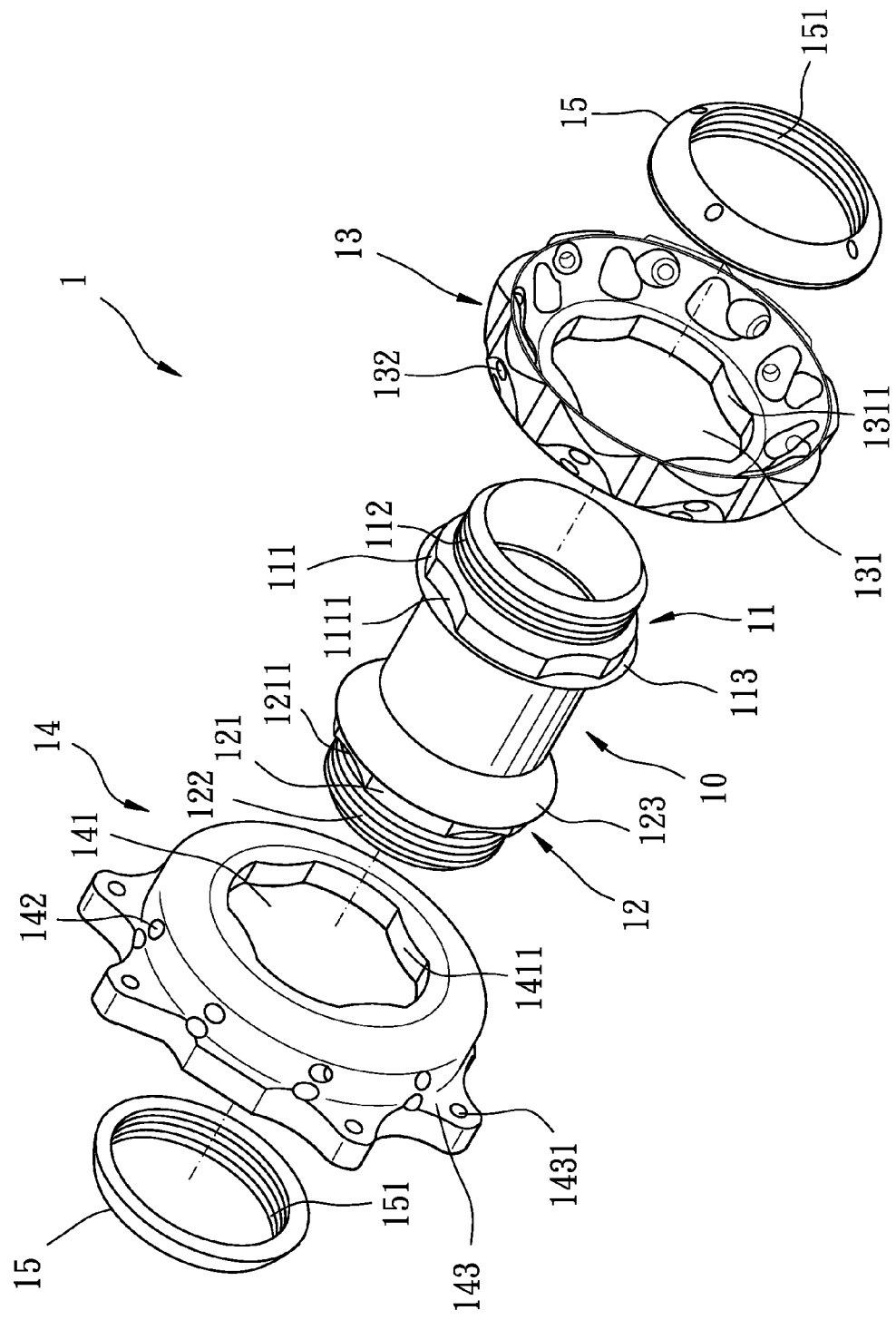
FIG. 1 is a perspective explosive view of a preferred embodiment of a hub for off-road motorcycle in accordance with the present invention.
Figure 2:
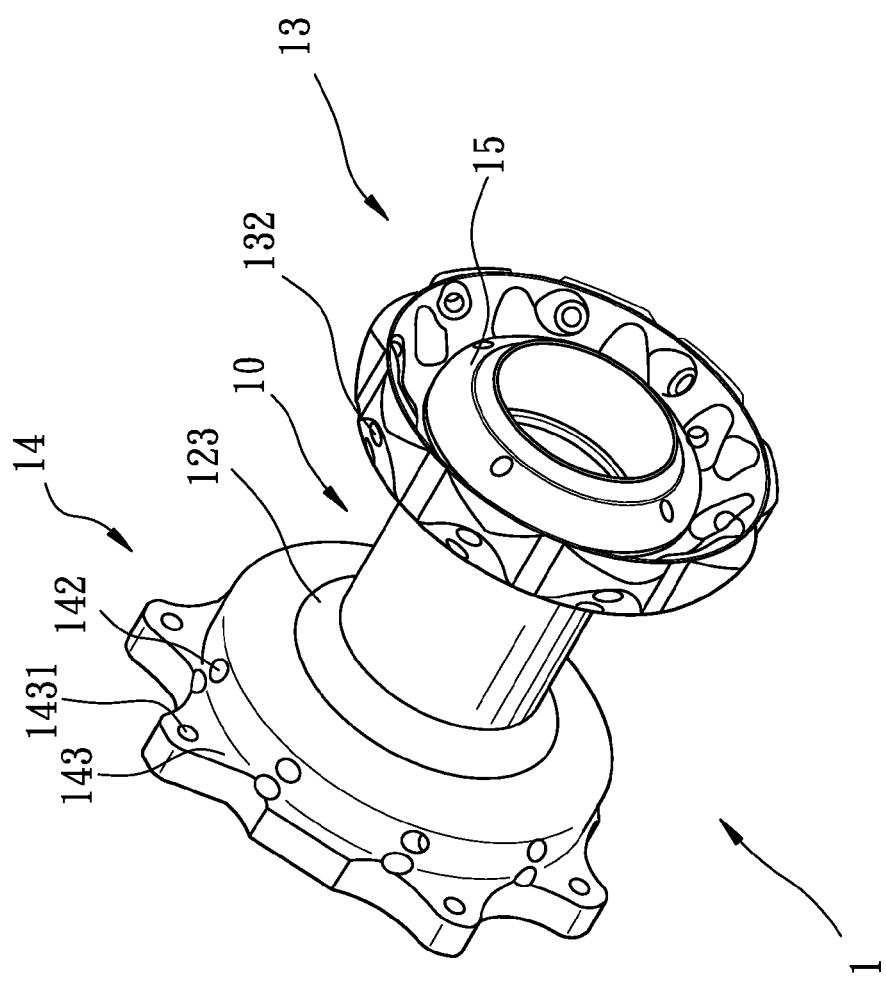
FIG. 2 is an assembled perspective view of the preferred embodiment of the hub for off-road motorcycle in accordance with the present invention.
Figure 3:
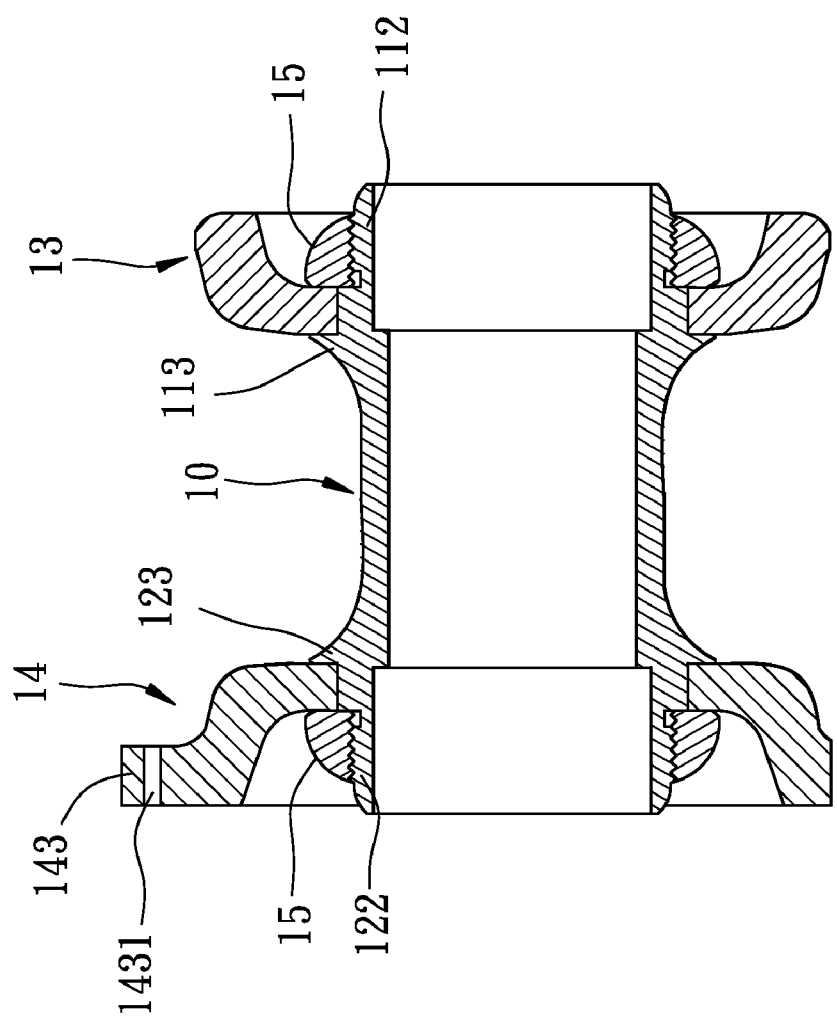
FIG. 3 is a cross-sectional plane view of the preferred embodiment of the hub for off-road motorcycle along an axis of a bearing in accordance with the present invention.

Referring to the drawings and initially to FIGS. 1-3, a hub for off-road motorcycle in accordance with a preferred embodiment of the present invention comprises a bearing (10). The bearing (10) is tubular and has a first portion (11) and a second portion (12) respectively formed on two opposite ends thereof. Each of the first and the second portions (11, 12) has a connecting flange (111, 121) radially extending from an outer periphery thereof. Each of the first and the second portions (11, 12) has an annular flange (113, 123) radially extending from the outer periphery thereof and adjacent to one lateral side of the connecting flange (111, 121). The two annular flanges (113, 123) are close to a middle part of the bearing (10) relative to the two connecting flange (111, 121). The annular flange (113, 123) has an outer diameter slightly larger than an outer diameter of the connecting flange (111, 121). Each of the two connecting flanges (111, 121) has a plurality of arc-shaped recesses (1111, 1211) defined radially spacedly on an outer periphery thereof. Each of the first and the second portions (11, 12) has a threaded portion (112, 122) formed outwardly thereon and adjacent to the other lateral side of the connecting flange (111, 121) opposite to the annular flange (113, 123).

In Addition, the hub (1) comprises a first annular element (13) having a first through hole (131) defined on a centre thereof. The hub (1) comprises a second annular element (14) having a second through hole (141) defined on a centre thereof. Each of the first and second through holes (131, 141) has a plurality of arc-shaped protrusions (1311, 1411) extending radially spacedly from an inner periphery thereof. The arc-shaped recesses (1111, 1211) are in a shape approximately corresponding to the arc-shaped protrusions (1311, 1411). An inner diameter of each of the first and the second through holes (131, 141) is slightly larger than the outer diameter of each of the two connecting flanges (111, 121).

When the first and second portions (11, 12) respectively pass through the first and second through holes (131, 141), the first and second annular elements (13, 14) respectively abut against the two annular flanges (113, 123) and the arc-shaped protrusions (1311, 1411) correspondingly engage with the arc-shaped recesses (1111, 1211), such that the first annular element (13) and the second annular element (14) respectively loosely engage with the two connecting flanges (111, 121) of the first and the second portions (11, 12).

Moreover, the first annular element (13) has a plurality of first spoke holes (132) defined radially spacedly thereon and extending through two lateral sides thereof. The second annular element (14) has a plurality of second spoke holes (142) defined radially spacedly thereon and extending through two lateral sides thereof. The first and second spoke holes (132, 142) are inclined at a preset angle relative to an axis of the bearing (10). The first spoke holes (132) are arranged staggeringly relative to the second spoke holes (142). The second annular element (14) has a plurality of locking portions (143) radially spacedly formed thereon. Each of the locking portions (143) has a bore (1431) laterally defined therein and being parallel to the bearing (10), such that the second annular element (14) is adapted to be locked on a sprocket or disc plate.

The hub (1) further comprises two retainers (15) respectively connected to the first portion (11) and the second portion (12). Each of the two retainers (15) has a threaded hole (151) defined in a centre thereof and extending through two lateral sides thereof for being correspondingly screwed to the threaded portion (112, 122), such that the two retainers (15) respectively abut against the first annular element (13) and the second annular element (14) for positioning the first and the second annular elements (13, 14) in place.

Accordingly, when the hub (1) adapts to be assembled with multiple spokes, one end of each of the spokes is correspondingly mounted in one of the spoke holes (132, 142). The first annular element (13) and the second annular element (14) are slightly pivotally rotated relative to the bearing (10), such that the other end of each spoke is able to adapt to easily, adjustably, and accurately assemble with a rim. When the assembly of the spokes is done, a nylon patch is applied to be filled between the first and the second annular elements (13, 14) and the two connecting flanges (111, 121). The two retainers (15) are respectively screwed on the two threaded sections of the first and the second portions (11, 12) for preventing the first and second annular elements (13, 14) from respectively detaching from the two connecting flanges (111, 121) and accurately securing the first and second annular elements (13, 14) in place.

Figure 4:
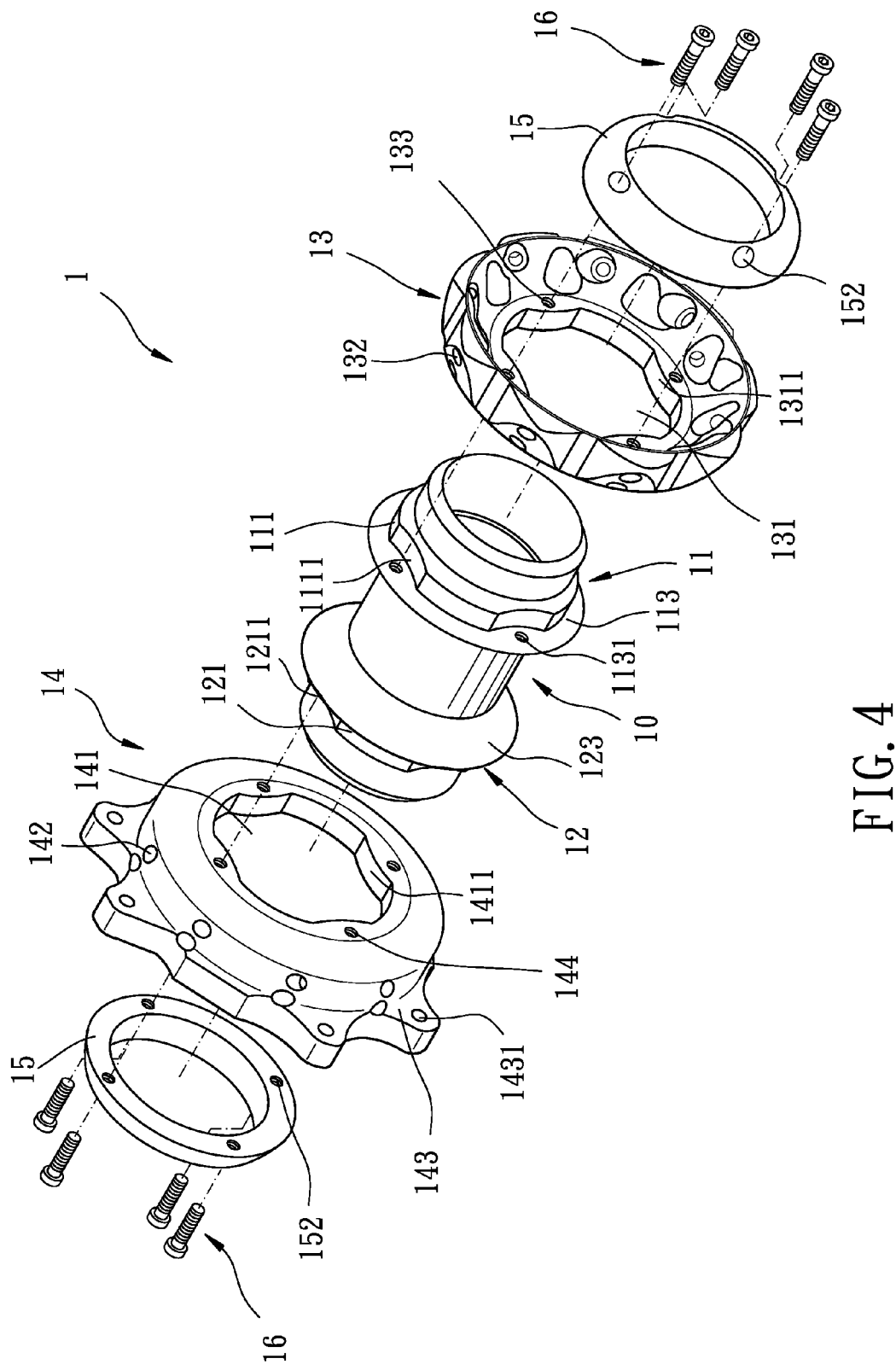
FIG. 4 is a perspective explosive view of a second embodiment of the hub for off-road motorcycle in accordance with the present invention.
Figure 5:
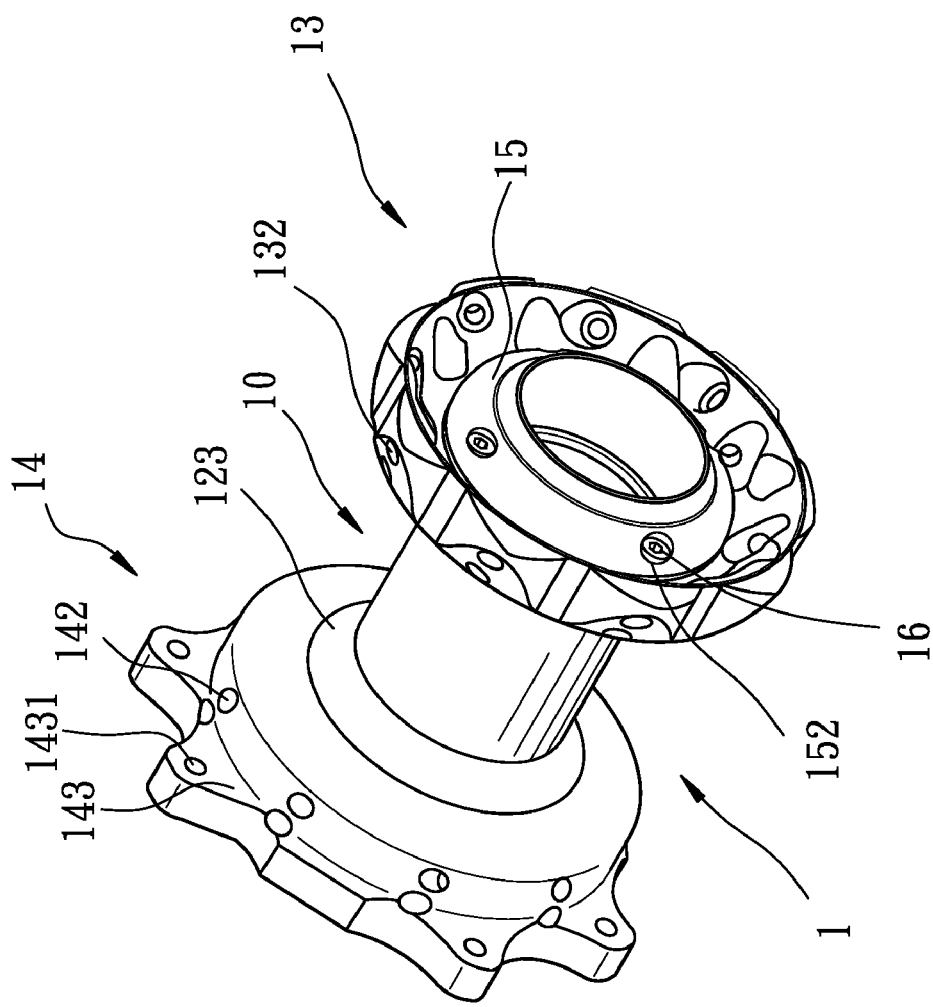
FIG. 5 is an assembled perspective view of the second embodiment of the hub for off-road motorcycle in accordance with the present invention.
Figure 6:
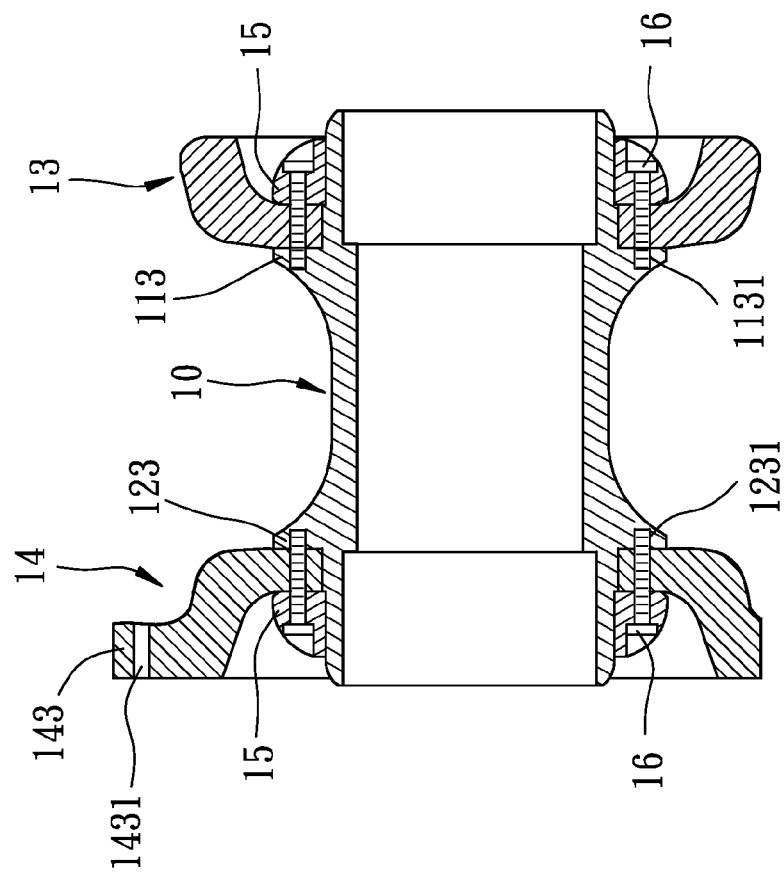
FIG. 6 is a cross-sectional plane view of the second embodiment of the hub for off-road motorcycle along an axis of a bearing in accordance with the present invention.

With reference to FIGS. 4-6, that shows a second embodiment of the hub for off-road motorcycle in accordance with the present invention. The elements and effects of the second embodiment which are the same with the preferred embodiment are not described, only the differences are described. In this embodiment, each of the first and the second annular elements (13, 14) has four screw holes (133, 144) defined therein. The four screw holes (133, 144) respectively extend through two lateral sides of the arc-shaped protrusions (1311, 1411). Each of the two annular flanges (113, 123) has four screw holes (1131, 1231) defined therein and corresponding to the four screw holes (133, 144) on each of the first and second annular elements (13, 14). Each of the two retainers (15) has four screw holes (152) defined therein and extending through two lateral sides thereof. The four screw holes (152) on each retainer (15) correspond to the four screw holes (133, 144) on each of the first and the second annular elements (13, 14). The hub (1) further includes eight screws (16) for locking the two retainers (15) and the first and the second annular elements (13, 14) on the bearing (10).

When the assembly of the spokes is done, a nylon patch is applied to be filled between the first and the second annular elements (13, 14) and the two connecting flanges (111, 121). Four screws respectively pass through the four screw holes (133, 144) on each of the first and the second elements (13, 14) via the four screw holes (152) on the corresponding retainer (15) and fasten in the four screw holes (1131, 1231) on each annular flange (113, 123) for preventing the first and second annular elements (13, 14) from respectively detaching from the two connecting flanges (111, 121) and accurately securing the first and second annular elements (13, 14) in place.

Although the invention has been explained in relation to its preferred embodiment, it is to be understood that many other possible modifications and variations can be made without departing from the spirit and scope of the invention as hereinafter claimed.

What is claimed is:

1. A hub for off-road motorcycle comprising:

a bearing having a first portion and a second portion respectively formed on two opposite ends thereof, each of the first portion and the second portion having a connecting flange extended therefrom, each of the two connecting flanges having a plurality of arc-shaped recesses defined radially spacedly on an outer periphery thereof;

a first annular element connected to the first portion, the first annular element having a first through hole defined on a centre thereof for loosely engaging with the connecting flange of the first portion, the first through hole having a plurality of arc-shaped protrusions extending radially spacedly from an inner periphery thereof, the arc-shaped recesses being in a shape approximately corresponding to the arc-shaped protrusions, an inner diameter of the first through hole being relatively larger than an outer diameter of a first connecting flange, the first annular element having a plurality of first spoke holes defined radially spacedly therein and extending through two lateral sides thereof;

a second annular element connected to the second portion, the second annular element having a second through hole defined in a centre thereof for loosely engaging with the connecting flange of the second portion, the second through hole having a plurality of arc-shaped protrusions extending radially spacedly from an inner periphery thereof, the arc-shaped recesses being in a shape approximately corresponding to the arc-shaped protrusions, an inner diameter of each of the second through hole being relatively larger than an outer diameter of a second connecting flange, the second annular element having a plurality of second spoke holes defined radially spacedly therein and extending through two lateral sides thereof; and two retainers respectively connected to the first portion and the second portion for respectively abutting against the first annular element and the second annular element in place;

wherein when the hub adapts to be assembled with spokes, the first annular element and the second annular element are slightly pivotally rotated relative to the bearing for adapting to easily adjustably assemble the spokes with a rim.

2. The hub for off-road motorcycle as claimed in claim 1, wherein each of the first and the second portion has a threaded portion formed outwardly thereon, each of the two retainers having a threaded hole defined in the centre thereof for being correspondingly screwed to the threaded portion.

3. The hub for off-road motorcycle as claimed in claim 1, wherein the second annular element has a plurality of locking portions extending radially spacedly therefrom, each of the locking portions having a bore defined therein, the first spoke holes arranged staggeringly relative to the second spoke holes.

4. The hub for off-road motorcycle as claimed in claim 1, wherein each of the first and the second annular elements having a plurality of screw holes defined in the arc-shaped protrusions, each of the two retainers having a plurality of screw holes defined therein and corresponding to the screw holes on the first and second annular elements, a plurality of screws passing through the screws holes on each of the first and the second annular elements via the screw holes on the corresponding retainer for screwedly securing the first and the second annular elements to the bearing.

* * * * *